(12) United States Patent
Mi et al.

(10) Patent No.: US 7,814,114 B2
(45) Date of Patent: Oct. 12, 2010

(54) TREE-BASED INFORMATION QUERY MODEL

(75) Inventors: Zheng Mi, Union City, CA (US); Brenton Asher Phillips, Yukon, OK (US); Sowmya Subramanian, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 156 days.

(21) Appl. No.: 11/470,077

(22) Filed: Sep. 5, 2006

(65) Prior Publication Data

US 2008/0059487 A1 Mar. 6, 2008

(51) Int. Cl.
*G06F 17/00* (2006.01)
(52) U.S. Cl. .............................. 707/760; 707/E17.014; 707/774
(58) Field of Classification Search .......... 707/E17.127, 707/774, E17.014, 760
See application file for complete search history.

(56) References Cited

U.S. PATENT DOCUMENTS

| | | | | |
|---|---|---|---|---|
| 5,778,373 | A * | 7/1998 | Levy et al. ................... | 707/748 |
| 6,233,584 | B1 * | 5/2001 | Purcell ......................... | 707/769 |
| 6,345,269 | B1 * | 2/2002 | Kappenberger et al. ..... | 707/760 |
| 7,133,864 | B2 * | 11/2006 | Roth ............................ | 707/708 |
| 7,349,905 | B1 * | 3/2008 | Jooste .......................... | 707/10 |
| 7,363,619 | B2 * | 4/2008 | Fleegal ........................ | 717/137 |
| 7,383,255 | B2 * | 6/2008 | Desai et al. .................. | 707/4 |
| 2003/0172145 | A1 * | 9/2003 | Nguyen ....................... | 709/223 |
| 2003/0212660 | A1 * | 11/2003 | Kerwin ........................ | 707/1 |
| 2004/0148612 | A1 * | 7/2004 | Olsen .......................... | 719/328 |
| 2004/0260691 | A1 * | 12/2004 | Desai et al. .................. | 707/4 |
| 2006/0136448 | A1 * | 6/2006 | Cialini et al. ................ | 707/101 |

FOREIGN PATENT DOCUMENTS

WO WO 2005072140 A2 * 8/2005

OTHER PUBLICATIONS

Tyson, How Virtual Private Networks Work, 2001, pp. 1-11.*
Goldstein, Writing SQL Queries, Let's Start with the Basics, 2005, pp. 1-8.*

* cited by examiner

*Primary Examiner*—James Trujillo
*Assistant Examiner*—Albert Phillips
(74) *Attorney, Agent, or Firm*—Aka Chan LLP

(57) ABSTRACT

A mechanism and method for querying between two data centers managed by two different data center management products is described. A single information query model is utilized to query multiple instances of another data center, which receives, translates and responds to the information query through the use of a schema. Knowledge of the other (foreign) data center's APIs for each instance is made unnecessary. Improved query efficiency is achieved by combining a plurality of disparate queries into a single information query. The responses to the plurality of queries are populated into a single reply to the information query, which is then transmitted back to the querying data center, translated and made readable to the IT administrator.

27 Claims, 5 Drawing Sheets

TREE-BASED INFORMATION QUERY MODEL

BACKGROUND OF THE INVENTION

1. Copyright Statement

A portion of the disclosure of this patent document contains material that is subject to copyright protection. The copyright owner has no objection to the facsimile reproduction by anyone of the patent document or the patent disclosure as they appear in the U.S. Patent and Trademark Office patent file or records, but otherwise reserves all copyright rights whatsoever.

2. Field of the Invention

This present invention relates to the field of information technology and more particularly to a mechanism for optimizing data center management software integration.

3. Description of Related Art

As business operations expand, corporate networks have evolved and now typically comprise one or more sophisticated data centers that are globally distributed but centrally managed. These data centers serve as repositories for the storage, management, and dissemination of data and information organized around a particular body of knowledge or pertaining to a particular business. Each data center may include application servers, database servers, web servers and other network infrastructure devices. To ensure efficient operation of the data center, commercially available management software products have been developed to monitor and manage faults that could impact data center operations. The entire system comprising the management software and the data center is known as the data center environment.

One such data center management software product is Enterprise Manager, a commercially available product offered by Oracle Corporation, the assignee of the present application. Enterprise Manager is an integrated management solution for managing the complete data center environment as one cohesive unit. Enterprise Manager facilitates the management of all services or instances within an enterprise data center, including hosts, databases, listeners, application servers, HTTP servers, collaboration suites, storage, network devices, load balancers and Web applications to extract information needed for critical and timely decisions. Other similar data center management software products include Hewlett Packard's OpenView, IBM's Tivoli Framework, Microsoft's Systems Management Server, LANDesk's Management Solutions Suite, Novell's ZENworks and CA's Unicenter.

In a typical data center, there are often multiple elements and instances, each of which comprise a running operating environment. In a typical data center, the elements may include application servers, application programs, storage devices network, and infrastructure devices such as load balancers, firewalls, intrusion detection devices, routers and the like. Each instance typically includes RDBMS software, table structure, stored procedures and other functionality. Each instance is a running database, such as an Oracle Database, made up of memory structures and background processes executing in computer memory. Multiple instances can be started for a single database on different nodes of a cluster.

A data center can often include hundreds of elements and thousands of instances for complex data structures. In order to learn the status of an element or instance, it must be queried by the data center management software. The status may be "up and running" if all is well, or may be "down" if there is a fault or issue. The data center management software may also manage the configuration of each element, as well as monitor and mange performance and alerts for each element and instances and storing the information for later analysis.

Information query is a common method to monitor the status and performance parameters, and manage configurations, events and faults of a data center. With prior art data center management software the information query is typically done in an application programming interface ("API") driven approach, meaning that the query calls the specific API for each instance in order to check the status of each element or instance. For a complex data structure, the calling program might need to invoke multiple APIs multiple times, and may need to invoke the same APIs repetitively. While inefficient, this is currently the most common method to elicit the status of each instance.

Often a business may have multiple data centers managed by different data center management software products. For example, one data center may be handled by Oracle's Enterprise Manager, another by HP's OpenView, and yet another data center by IBM's Tivoli management software. IT administrators tasked with maintaining and transferring data between the data centers are commonly challenged by the potential for incompatibility. Specifically, each brand of data center management software has its own set of information query models that work with a specific library of APIs developed by each manufacturer. In order to query a data center, the IT administrator will need to know which query model works with which API, requiring proficiency with a large number of query-API constructs. Any change to the data center management software will necessitate learning new query models and new APIs.

Additionally, other problems arise when the IT administrator often does not have enough information about instances managed by the other data centers. An effective query requires knowledge of all of the instances available for query; however, as new data centers are acquired, the IT administrator is unlikely to know all of the instances under the new data center's control. These issues lead to an inefficient use of data center resources.

What is needed is a mechanism that not only responds to status requests regardless of the quantity of known and unknown instances, but also efficiently and conveniently integrates and accesses different data centers regardless of the data center management software that maintains those different data centers. The mechanism should also obviate the need for repetitive queries, and should also make learning different query models and APIs for different data centers unnecessary.

BRIEF SUMMARY OF THE INVENTION

The present invention comprises a mechanism and method of information query between a plurality of data centers managed by different data center management software products. Advantageously, the present invention will enable the IT administrator of one data center to query the elements and instances of another data center with a single information query model. Knowledge of the other data center's query model, elements, instances, or the corresponding APIs is made unnecessary by the present invention. Advantageously, the present invention provides a heterogeneous enterprise-wide solution where multi-vendor data center management software exists.

The present invention comprises of a mechanism in which one data center can determine the status of elements or instances in the foreign data center by generating a single information query. At the foreign data center, the information query is translated into a form understandable by the foreign data center's management software program. Preferably, a schema is used to translate the information query and reference the appropriate APIs for the queried instances. In other embodiments, the schema maps the leaf nodes to a corresponding API call.

Subsequently, the responses to the information query are returned back to the home data center. The schema may be used to populate a single reply to the information query, which is then made readable by the IT administrator. Alternatively, the home data center may apply a schema to translate the foreign data center's response.

Other and further objects, features, aspects and advantages of the present invention are found in the following detailed description of the embodiments and the accompanying drawings.

BRIEF DESCRIPTION OF THE DRAWINGS

The accompanying drawings, which are incorporated into and constitute part of this specification, illustrate one or more embodiments of the present invention and, together with the detailed description, serve to explain the principles and implementations of the invention.

DETAILED DESCRIPTION OF THE INVENTION

Embodiments of the present invention are herein described in the context of a mechanism and method for using an information query model to query a plurality of data centers, each data center managed by a different data center management software product. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the IT administrator's specific goals, such as compliance with application- and business-related constraints, and that these specific goals will vary from one implementation to another and from one IT administrator to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data centers may be implemented using various types of operating systems, computing platforms, computer programs, and/or general purpose machines. In addition, those of ordinary skill in the art will recognize that devices of a less general purpose nature may also be used without departing from the scope and spirit of the inventive concepts disclosed herein.

Figure 1:
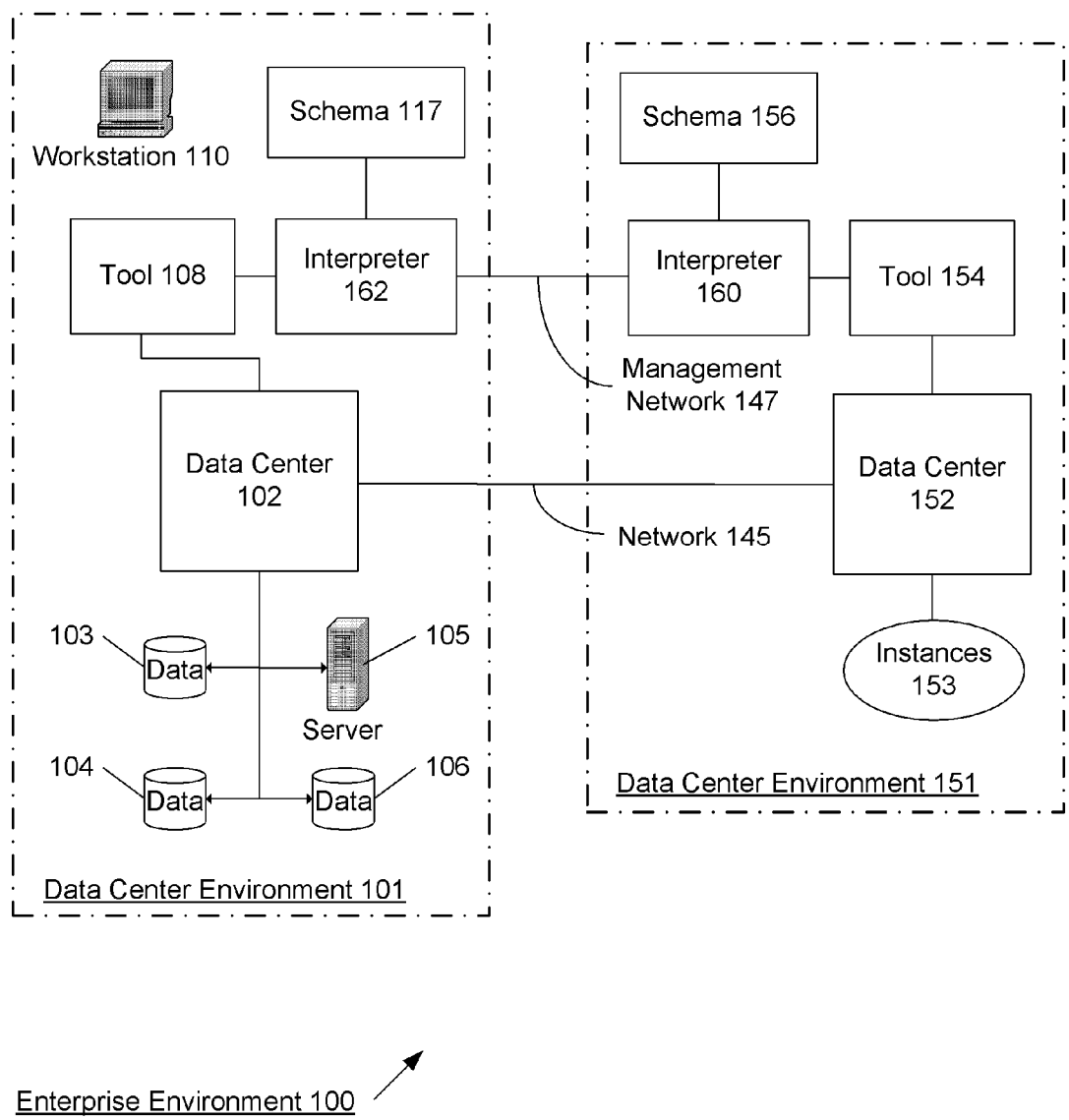
FIG. 1 shows a block diagram of an enterprise environment having a plurality of data center environments that operate in accordance with an embodiment of the present invention.

FIG. 1 illustrates the general architecture of a representative network enterprise data center system 100 having a data center environment 101 that operates in accordance with one embodiment of the present invention. A typical data center environment may include a data center 102, a plurality of elements and instances 103, 104, 105 and 106, and data center management software tool 108 that manages data center environment 101. Tool 108 typically include hundreds application program interfaces (APIs) that can be called to acquire attributes of the instances associated with data center 102. An IT administrator interested in managing or monitoring data center 102 will use a computer terminal or workstation 110 to interact with data center environment 101 through tool 108.

Data center 102 typically comprises network infrastructure devices such as routers, switches, firewalls, intrusion detection systems, load balancers and other such devices. The network infrastructure devices are routine features of a typical data center implementation and are not otherwise described or shown herein. Data center 102 operates to connect users to various servers, such as application servers and HTTP servers, server-based applications, network appliances such as SAN or other storage devices, network devices, load balancers, and the like. As is understood in the art, the servers, applications, appliances, or devices in data center 102 can each be viewed as an independent instance with a distinct role or responsibility. Further, it will be appreciated that an instance may be a host, database, listener, collaboration suite, or a Web application. Note that in a typical data center the number of instances can vary from a few to several thousands. In FIG. 1, instances 103-106 are merely illustrative of what instances can be, and are not intended to limit the present invention in any manner.

Tool 108 offers the IT administrator the ability to discover and track performance parameters, configurations, network events and alarms and status changes (collectively referred to herein as "status" unless otherwise specifically noted otherwise) and any of a plurality of other attributes associated with each of the instances in data center 102. This eliminates the need to manually track status changes or other attributes and can speed up troubleshooting efforts when problems occur. Tool 108 can also be used to specify and enforce enterprise access and use policies.

In many enterprises, enterprise environment 100 may comprise one or more additional data centers environments 151 that includes, by way of example, data center 152. Note that data center 152 also has a plurality of instances 153 but the structure and status of such instances will not generally be known to an IT administrator attempting to monitor the enterprise environment from workstation 110.

A network 145, such as the Internet or an intranet. Connects data centers 102 and 152. This network connection enables data and control information to be exchanged between the data centers, and allows consumers to access information, applications and services. Administrative matters may be handled over network 145, or they may be routed over a management network 147 that is dedicated to handling traffic related to administrative or management functions. One example of network 147 is a simple network management protocol (SNMP) network.

For a variety of reasons, data center 152 may be managed by data center management software tool 154, rather than tool 108, provided by a different commercial vendor. Tool 154 operates to manage data center environment 151 and includes hundreds APIs that can be called to acquire attributes of the instances 153 associated with data center 152. Note that data center 152 may also comprise network infrastructure devices that are not otherwise described or shown herein.

When the IT administrator at workstation 110 requires status or other attribute information regarding an instance 153 in data center environment 151 or has to identify available resources in data center 152, the IT administrator needs to expose the API of each instance 153. Once the APIs are exposed, it is possible to discover and track status changes to any of the instances in data center 152 from workstation 110 by the IT administer, thereby enhancing the ability to efficiently manage and control enterprise environment 100.

As is well known in the art, obtaining the status or attributes of an instance in another data center, such as data center 152, is accomplished through a query typically initiated by the IT administrator at workstation 110. However, because tools 108 and 154 are often provided by different vendors, and because tools from different vendors utilizes different models and APIs to manage the respective data center environment, it is not possible for tool 108 to issue the appropriate calls to the instances in data center 152. Advantageously, the present invention eliminates the need of the IT administrator to understand both models and both sets of APIs in order to obtain the status or attribute information. Further, if one of the target instances is changed, then the present invention relieves the IT administrator from the need to understand or otherwise acquire detailed information regarding the new APIs associated with such changes.

To illustrate, if the IT administrator desires to determine the number of instances 153 in data center 152 and the status of a selected few instances, the present invention enables the IT administrator to issue a single information query to expose the APIs of the such instances. Accordingly, the present invention is substantially faster, adaptive, and more efficient than how IT administrators have previously operated.

In accordance with one embodiment of the present invention, a schema is associated with each tool 108 and 154. Specifically, schema 117 is associated with tool 108, and schema 156 is associated with tool 154. Each schema 112 and 156 is tasked with translating a model-based query into the appropriate APIs.

Figure 2:
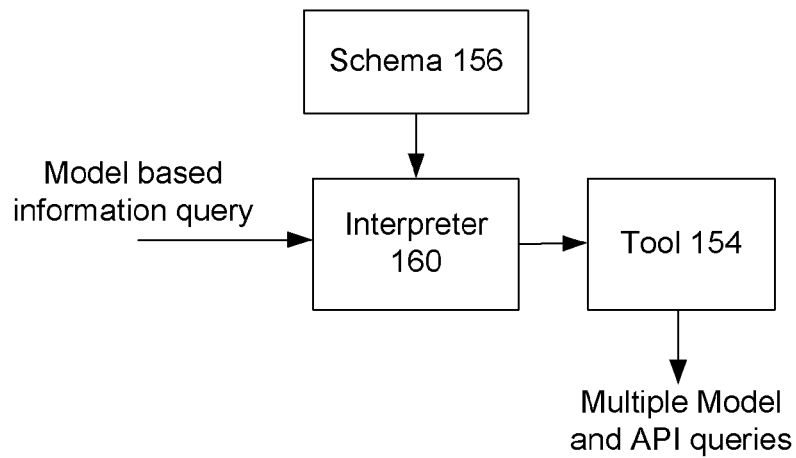
FIG. 2 is a block diagram illustrating components of a foreign data center environment according to an embodiment of the present invention.

FIG. 2 is a block diagram illustrating components of a data center environment according to an embodiment of the present invention. When the status or attributes of one or a plurality of instances at another (foreign) data center is required by the IT administrator at the home data center (that is, by way of example, data center environment 101), a single model based information query is generated and sent to the foreign data center (by way of example, data center environment 151) on a network, such as network 147 (FIG. 1). As used herein, the home data center is the source of an information query and the foreign data center comprises the instances that are the target of the query. In one embodiment, the foreign data center may include a Real Application Cluster ("RAC") database, which is commercially available from Oracle Corporation, the assignee of this present application.

At the foreign data center, the model based information query is passed to an interpreter 160 associated with tool 154. The function of interpreter 160 is to interpret the model based information query based on the rules and definitions contained in schema 156. Interpreter 160 may also parse the model based information query into a plurality of individual information queries and queue the plurality of queries for handling by tool 154. The combination of interpreter 160 and schema 156 functions to provide an interface between data centers 102 and 152 where each data center operates under different management tools. Schema 156 is provided to the foreign data center based on a pre-defined mapping. Thus, when interpreter 160 receives the model based query, it applies a transformation to the information query to create individual queries. Note that the queries generated by tool 108 as a result of the model based query include the appropriate information to expose the APIs and show the data structure of the instances in the foreign data center.

Figure 3:
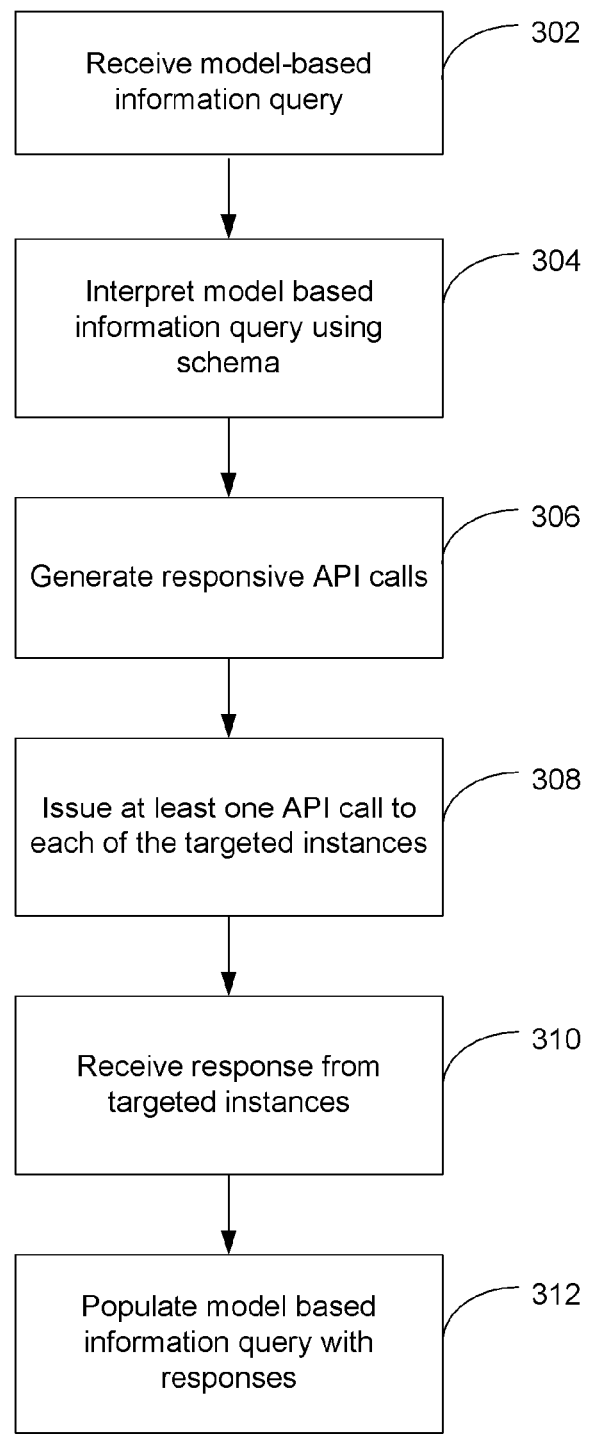
FIG. 3 illustrates a method for querying a foreign data center in accordance with an embodiment of the present invention.

FIG. 3 illustrates a method for performing the information query process in accordance with an embodiment of the present invention. Specifically, when an information query is received, as indicated at 302, the foreign data center uses schema 156 to interpret the model based information query as indicated at 304. With schema 156, tool 154 is able to generate the appropriate API calls for targeted instances, as indicated at 306. By interpreting the information query at the foreign data center, the IT administrator at the home data center is not required to manually associate each queried instance with the instance's APIs. Tool 154 then issues the appropriate calls to each instance referenced in the original model based information query, as indicated at 308.

Responsive to the information query and the generated API calls, tool 154 receives responses from each of the targeted instances 153, as indicated at 310. Tool 154, in conjunction with interpreter 160 and schema 156 then populates a response that is organized based on the format of the model based information query, as indicated at 312.

In one embodiment of the present invention, the model based information query is written in extensible markup language ("XML"). While such an information query can take many forms based on the engineering requirements of a particular application, it is advantageous to compose an XML query in a format that permits the query of multiple instances in a single model-based information query. The following information query, labeled "QueryModel," is illustrative of such a query:

```
<QueryModel>
    <RAC>
        <Name>rac</Name>
        <Property>
            <Name>Status</Name>
            <Value xsd:nil="true"></Value>
        </Property>
        <Instance>
            <Name>rac1</Name>
            <Property>
                <Name>Status</Name>
                <Value xsd:nil="true"></Value>
            </Property>
        </Instance>
        <Instance>
            <Name>rac2</Name>
            <Property>
                <Name>Status</Name>
                <Value xsd:nil="true"></Value>
            </Property>
        </Instance>
    </RAC>
    <Host>
        <Name>server1</Name>
        <Property>
```

-continued

```
        <Name>Status</Name>
        <Value xsd:nil="true"></Value>
    </Property>
    <Property>
        <Name>OS</Name>
        <Value xsd:nil="true"></Value>
    </Property>
</Host>
</QueryModel>
```

In an embodiment of the present invention, the information query follows a tree-based query model where multiple instances, each of which comprises a leaf, are listed. Thus, for the above illustrated information query model the request for the status of a Real Application Cluster ("RAC") database and two instances called rac1 and rac2 in addition to a server1 instance. Each instance (RAC, server1 and the two instances) is considered a leaf node.

One advantage provided by the model based information query, and illustrated by the above QueryModel is that the same model based information query can be used to query any foreign data center. Thus, if an enterprise environment includes a plurality of data center environments, each of which is managed by a different vendor supplied tool, a single model based information query can be used to expose the APIs of the plurality of instances. The above illustrated QueryModel shows an example of how an information query can be passed between at least two different data centers with a single XML query. Since the responses from all queried data centers are returned in XML format, the information obtained from the query can be quickly parsed and presented to the IT administrator on workstation 110 (see FIG. 1). The following listing is illustrative of an XML response to the above information query:

```
<QueryModel>
<RAC>
    <Name>rac</Name>
    <Property>
        <Name>Status</Name>
        <Value>Up</Value>
    </Property>
    <Instance>
        <Name>rac1</Name>
        <Property>
            <Name>Status</Name>
            <Value>Down</Value>
        </Property>
    </Instance>
    <Instance>
        <Name>rac2</Name>
        <Property>
            <Name>Status</Name>
            <Value>Up</Value>
        </Property>
    </Instance>
</RAC>
<Host>
    <Name>server1</Name>
    <Property>
        <Name>Status</Name>
        <Value>Up</Value>
    </Property>
    <Property>
        <Name>OS</Name>
        <Value>Redhat Linux</Value>
    </Property>
</Host>
</QueryModel>
```

In another embodiment, a data center can be queried even when the exact number and structure of the instances are unknown. In response to the interpreted information query model, the foreign data center will search for answers by issuing one or more API calls internally, and will then populate the leaf nodes of the query model accordingly with the responses received from the queried instances. The following XML listing is illustrative of this embodiment:

```
<QueryModel>
<RAC>
    <Name>*</Name>
    <Property>
        <Name>Status</Name>
        <Value xsd:nil="true"></Value>
    </Property>
    <Instance>
        <Name>*</Name>
        <Property>
            <Name>Status</Name>
            <Value xsd:nil="true"></Value>
        </Property>
    </Instance>
</RAC>
<Host>
    <Name>*</Name>
    <Property>
        <Name>Status</Name>
        <Value xsd:nil="true"></Value>
    </Property>
    <Property>
        <Name>OS</Name>
        <Value xsd:nil="true"></Value>
    </Property>
</Host>
</QueryModel>
```

As shown by the above, the present invention is flexible and adaptive. In a single information query, IT administrators can ask for information in different or unrelated areas, such as RAC and Host, and different levels of information, such as RAC and Instance. The source of the information query will get the answer in a single response. The present invention therefore makes querying very convenient and efficient. Since a single information query replaces a plurality of API calls, the need for network bandwidth is reduced because a single round trip query can provide the same information as literally hundreds of queries required in the prior art systems. Advantageously, IT administrators can receive the responsive information faster and with less effort in accordance with the present invention.

Another advantage of the present invention arises because the model based information query is very extensible and adaptable to changes at foreign data centers. When an instance is added or changed, there is no need to learn any new APIs because the combination of the interpreter and the schema provides a uniform interface to the home data center and handles the translation into foreign data center specific API calls. The present invention obviates the need to gather extensive API libraries formerly required to keep up with changes in foreign data center, thereby simplifying integration of multiple tools in managing a complex enterprise environment with multiple data center environments.

As a further benefit, there is no new code that needs to be written on the foreign data center side. Results responsive to the leaf nodes in the model based information query model are returned in XML format, as illustrated above.

The present invention also ensures consistent interface. Queries and results are always passed as XML trees. Both queries and results are easy to understand and interpret, so long as the querying data center and the responding data center both subscribe to the appropriate schema in accordance with the present invention.

In accordance with an embodiment of the present invention, schema 117 and 156 comprise a description of the structure and rules a model based information query (or XML document) must satisfy. The schema includes the formal declaration of the elements that make up a document, and can be extended to accommodate more features as needed. Note that the schema may vary for each data center and may be readily extended or adapted depending on the configuration or needs of a particular data center. Note further that the actual schema that may be selected for a particular implementation is deemed to be an engineering decision based on the specific requirements and may differ from the illustrated schema. One example of an illustrative schema follows:

```
<?xml version="1.0" encoding="UTF-8" ?>
<xsd:schema
xmlns:xsd="http://www.w3.org/2001/XMLSchema"
xmlns="http://xmlns.oracle.com/sysman/connector/msi"
targetNamespace="http://xmlns.oracle.com/sysman/connector/msi"
                        elementFormDefault="qualified">
    <xsd:simpleType name="Name">
      <xsd:restriction base="xsd:string"/>
    </xsd:simpleType>
    <xsd:simpleType name="Type">
      <xsd:restriction base="xsd:string"/>
    </xsd:simpleType>
    <xsd:simpleType name="TargetType">
      <xsd:restriction base="xsd:string"/>
    </xsd:simpleType>
    <xsd:simpleType name="AggregateTargetType">
      <xsd:restriction base="xsd:string">
         <xsd:enumeration value="cluster"/>
         <xsd:enumeration value="rac_database"/>
      </xsd:restriction>
    </xsd:simpleType>
    <xsd:simpleType name="Host">
      <xsd:restriction base="xsd:string"/>
    </xsd:simpleType>
    <xsd:simpleType name="Username">
      <xsd:restriction base="xsd:string"/>
    </xsd:simpleType>
    <xsd:simpleType name="Password">
      <xsd:restriction base="xsd:string"/>
    </xsd:simpleType>
    <xsd:simpleType name="Value">
      <xsd:restriction base="xsd:string"/>
    </xsd:simpleType>
    <xsd:simpleType name="RequestID">
      <xsd:restriction base="xsd:string"/>
    </xsd:simpleType>
    <xsd:complexType name="Credential">
       <xsd:sequence>
          <xsd:element name="Name" type="Username"/>
          <xsd:element name="Password" type="Password"/>
       </xsd:sequence>
    </xsd:complexType>
    <xsd:complexType name="Threshold">
       <xsd:sequence>
          <xsd:element name="ColumnName" type="xsd:string"/>
          <xsd:element name="Operator" type="xsd:string"/>
          <xsd:element name="WarningValue" type="Value" minOccurs="0"/>
          <xsd:element name="CriticalValue" type="Value"
```

-continued

```
minOccurs="0"/>
          <xsd:element name="Response" type="xsd:string" minOccurs="0"/>
          <xsd:element name="Occurrences" type="xsd:int"/>
       </xsd:sequence>
    </xsd:complexType>
    <xsd:complexType name="Metric">
       <xsd:sequence>
          <xsd:element name="Name" type="Name"/><!-- for example, ECM or regular. -->
          <xsd:element name="Type" type="Type"/>
          <xsd:element name="Threshold" type="Threshold" minOccurs="0" maxOccurs="unbounded"/>
       </xsd:sequence>
    </xsd:complexType>
    <xsd:complexType name="Property">
       <xsd:sequence>
          <xsd:element name="Name" type="Name"/>
          <xsd:element name="Value" type="Value" nillable="true"/>
       </xsd:sequence>
    </xsd:complexType>
    <xsd:complexType name="ComplexProperty">
       <xsd:sequence>
          <xsd:element name="Type" type="Type"/>
          <xsd:element name="Property" type="Property" maxOccurs="unbounded"/>
       </xsd:sequence>
    </xsd:complexType>
    <xsd:complexType name="RequestHeader">
       <xsd:sequence>
          <xsd:element name="RequestID" type="RequestID"/>
          <xsd:element name="Source" type="Name"/>
          <xsd:element name="Destination" type="Name"/>
          <xsd:element name="RequestProperty" type="ComplexProperty" minOccurs="0"/>
       </xsd:sequence>
    </xsd:complexType>
    <xsd:complexType name="StorageType">
       <xsd:sequence>
          <xsd:element name="Type">
             <xsd:simpleType>
                <xsd:restriction base="xsd:string">
                   <xsd:enumeration value="CFS"/>
                   <xsd:enumeration value="ASM"/>
                   <xsd:enumeration value="RAW"/>
                </xsd:restriction>
             </xsd:simpleType>
          </xsd:element>
          <xsd:element name="Property" type="Property" maxOccurs="unbounded"/>
       </xsd:sequence>
    </xsd:complexType>
    <xsd:complexType name="Job">
       <xsd:sequence>
          <xsd:element name="JobId" type="xsd:string"/>
          <xsd:element name="Target" type="Target" maxOccurs="unbounded" minOccurs="0"/>
          <xsd:element name="JobStatus" type="xsd:int" nillable="true" minOccurs="0"/>
          <xsd:element name="Property" type="Property"/>
          <xsd:element name="Parameter" type="Property" minOccurs="0" maxOccurs="unbounded"/>
       </xsd:sequence>
    </xsd:complexType>
    <xsd:complexType name="Target">
       <xsd:sequence>
          <xsd:element name="Name" type="Name"/>
          <xsd:element name="Type" type="TargetType"/>
          <xsd:element name="Host" type="Host" minOccurs="0"/>
          <xsd:element name="Storage" type="StorageType" minOccurs="0"/>
          <xsd:element name="Credential" type="Credential" minOccurs="0"/>
          <xsd:element name="Property" type="Property" minOccurs="0" maxOccurs="unbounded"/>
```

-continued

```
        <xsd:element name="ComplexProperty"
type="ComplexProperty" maxOccurs="unbounded"
minOccurs="0"/>
        <xsd:element name="Metric" type="Metric"
minOccurs="0" maxOccurs="unbounded"/>
      </xsd:sequence>
    </xsd:complexType>
    <xsd:complexType name="AggregateTarget">
      <xsd:sequence>
        <xsd:element name="Name" type="Name"/>
        <xsd:element name="Type"
type="AggregateTargetType"/><!-- for Aggregate
target, the host is not required. -->
        <xsd:element name="Host" type="Host"
minOccurs="0"/>
        <xsd:element name="Storage" type="StorageType"
minOccurs="0"/>
        <xsd:element name="Credential"
type="Credential" minOccurs="0"/>
        <xsd:element name="Target" type="Target"
minOccurs="1" maxOccurs="unbounded"/>
        <xsd:element name="Property" type="Property"
minOccurs="0" maxOccurs="unbounded"/>
        <xsd:element name="ComplexProperty"
type="ComplexProperty" maxOccurs="unbounded"
minOccurs="0"/>
        <xsd:element name="Metric" minOccurs="0"
maxOccurs="unbounded"/>
      </xsd:sequence>
    </xsd:complexType>
    <xsd:element name="EMModel">
      <xsd:annotation>
        <xsd:documentation>EM Model in integration.
        </xsd:documentation>
      </xsd:annotation>
      <xsd:complexType>
        <xsd:sequence minOccurs="1">
          <xsd:element name="RequestHeader"
type="RequestHeader"/>
          <xsd:element name="Credential" minOccurs="1"
type="Credential"/>
          <xsd:element name="Job" type="Job"
minOccurs="0" maxOccurs="unbounded"/>
          <xsd:element name="AggregateTarget"
minOccurs="0" maxOccurs="unbounded"
type="AggregateTarget"/>
          <xsd:element name="Target" minOccurs="0"
maxOccurs="unbounded" type="Target"/>
        </xsd:sequence>
      </xsd:complexType>
    </xsd:element>
  </xsd:schema>
```

Figure 4:
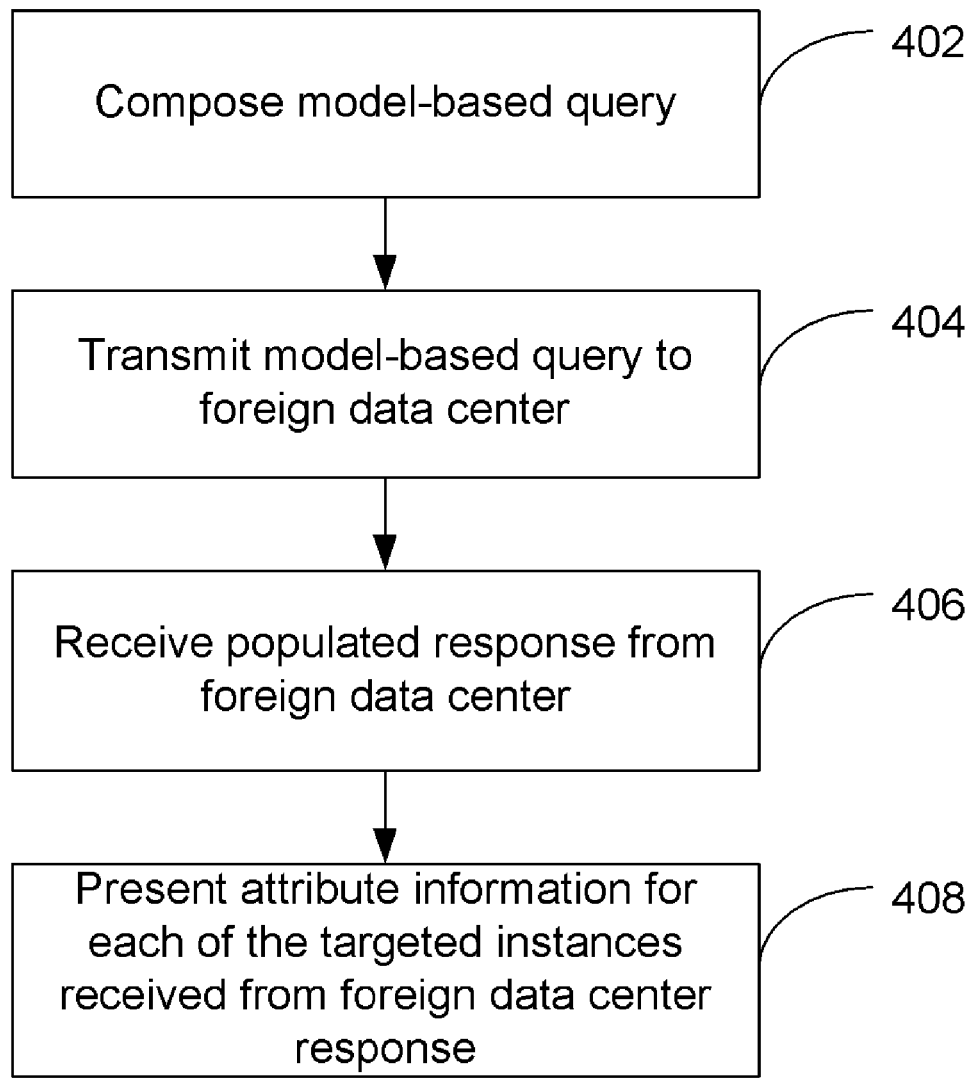
FIG. 4 illustrates a method for handling a model based information query at a foreign data center in accordance with an embodiment of the present invention.

FIG. 4 illustrates a method for handling a model based information query at a foreign data center in accordance with an embodiment of the present invention. Initially, a model based information query is composed in an XML format that conforms to the schema for the target foreign data center, as indicated at 402. In one embodiment, an interpreter 162 (see FIG. 1) is responsible for formulating the model based information query based on the nature of the request from tool 108 in view of schema 117.

This information query is transmitted to one or more foreign data centers, as indicated at 404. After the interpreter at the foreign data center receives the information query, it applies the schema to translate and interpret the request. The tool at the foreign data center processes the translated queries to generate the appropriate APIs and generate the response. The response is populated with information from the targeted instances in a tree-like formatted response that has leaf nodes corresponding to the leaf nodes of the model based information query. After response tree is populated, the foreign data center transmits the response to the home data center.

When the home data center receives the response, interpreter 162, as indicated at 406, applies the schema to decode the information contained the response. In one embodiment, the response is in the form of an XML tree with a plurality of leaf nodes comprising status and attribute information of the queried instances. This information is then available for use by tool 108 and for display on workstation 110 for the benefit of the IT administrator, as indicated at 408.

While this process flow illustrates one embodiment of the present invention, where data center environment 101 is shown as the home data center functioning as the source of the information query, it will be appreciated that the respective designation of home and foreign data centers is interchangeable. Thus, it is contemplated that, in some embodiments, data center environment 150 (or some other data center) will function as the source of the information queries and data center environment 101 (or some other data center) will function as the foreign data center.

Figure 5:
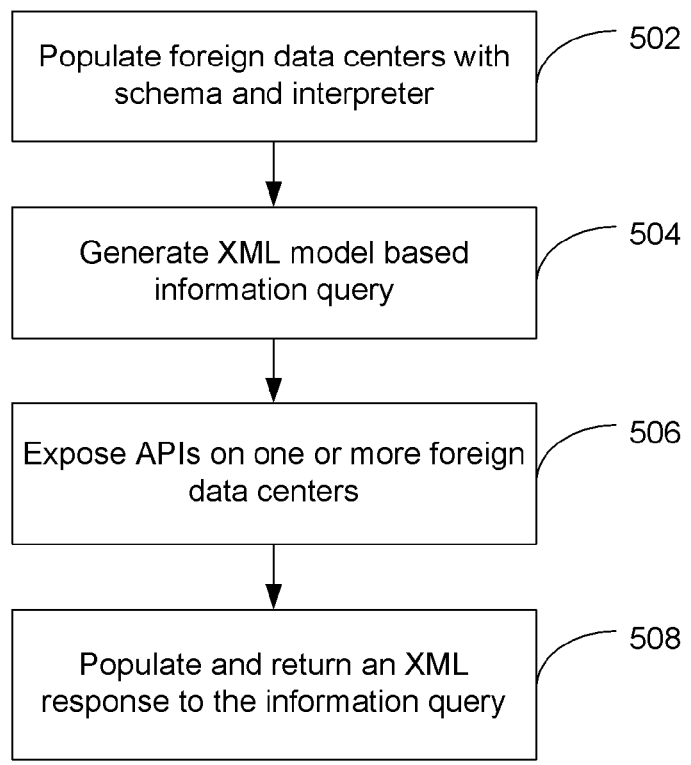
FIG. 5 illustrates another method for querying a foreign data center in accordance with an embodiment of the present invention.

FIG. 5 illustrates another method for querying a foreign data center in accordance with an embodiment of the present invention. As indicated at 502, the initial requirement is to populate foreign data centers with schema and interpreter. The interpreter at the foreign data center initially acts as the front end to receive information queries from a home data center.

When an information query is received, the interpreter uses the schema to generate a plurality of XML model based information queries as indicated at 504. Advantageously, the same information query can be directed to additional foreign data centers and need not be drafted on a case by case basis. Thus, a generalized information query can be sent from a home data center to a plurality of foreign data centers. The plurality of queries interpreted by the interpreter are then used by the tool to expose APIs on the foreign data center as indicated at 506. Finally, as indicated at 508, the interpreter populates and returns an XML response to the home data center in response to the information query providing the requested status and attribute information.

Figure 6:
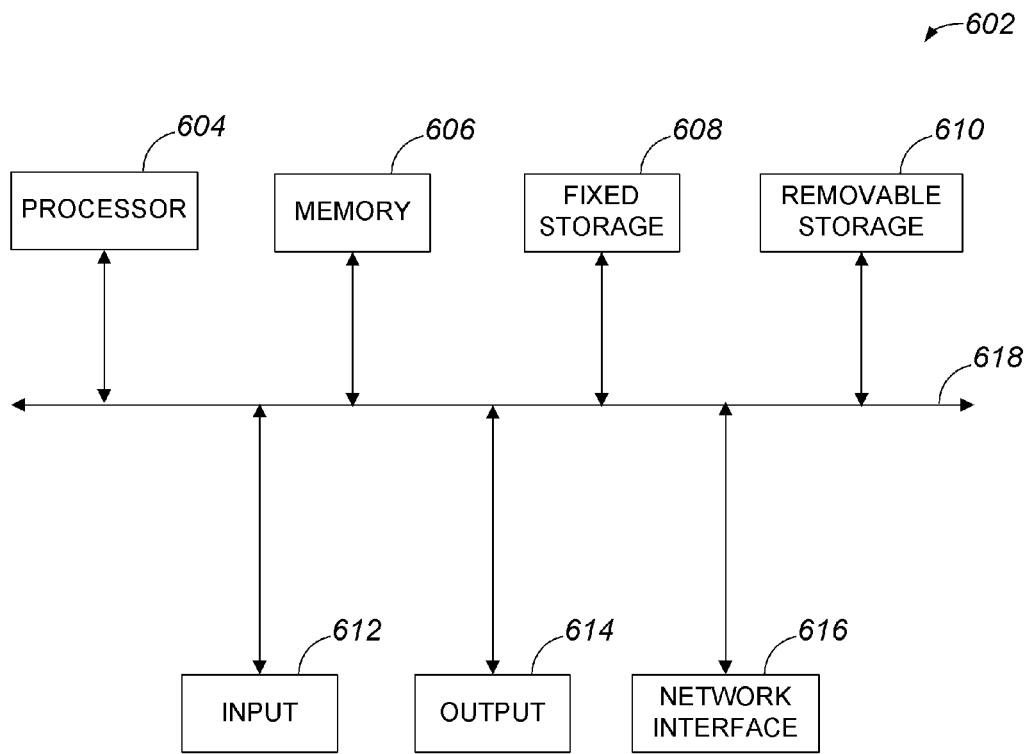
FIG. 6 is a block diagram representation of a computing system that may be utilized in association with the embodiments of the present invention

FIG. 6 shows a block diagram of components that may be present in one or more of the computer systems 602, such as workstation 110 or server 105, that implement embodiments of the present invention. Specifically, a computer system 602 includes a processor 604 that executes instructions from computer programs, including operating systems. Processor 604 may be utilized to allow a semantic engine, for example, to run. Although processor 604 typically has memory caches, processor 604 may utilize memory 606, which may store instructions or computer code and data to implement embodiments of the present invention.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed.

A fixed storage 608 may store computer programs and data. Fixed storage 608 is typically persistent, and provides more storage than memory 606. One example of a typical fixed storage 608 for databases comprises multiple hard drives, although it should be understood that fixed storage 608 maybe be any suitable component. A removable storage 610 provides mobility to computer programs and/or data that are stored thereon. Removable storage 610 may include, but is not limited to, mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Memory 606, fixed storage 608 and removable storage 610 provide examples of computer-readable storage media that may be utilized to store and retrieve computer programs incorporating computer codes or code devices that implement the invention, data for use with the invention, and the like. Additionally, a data signal embodied in a carrier wave, e.g., in a network such as the Internet or an Intranet, may also be a computer-readable storage medium. An input device 612 allows a user to interface with computer system 602. Input device 612 may be a keyboard, a mouse, buttons, dials, or any other suitable input mechanism. An output device 614 generally allows system 602 to provide output to the user. Output device 614 may include, but is not limited to, devices such as monitors, display screens, LEDs, printers, or substantially any other output mechanism.

Additional peripherals may be connected to the system through a network interface 616 or other interface such as serial, parallel, or universal serial bus (USB) interfaces.

Network interface 616 typically allows system 602 to interface with a network to which it is connected. The system bus architecture of computer system 602 is represented by arrows 618. The components shown in FIG. 6 may be found in many computer systems. However, components may be added, deleted, and combined without departing from the spirit or the scope of the present invention. For example, fixed storage 608 may be a file server that is accessed through a network connection. Thus, FIG. 6 is for illustration purposes and is not limiting.

In one embodiment, an IT administrator utilizes computer system 602 to initiate a query selected or unknown instances and to determine the properties or attributes of multiple instances. The query is model based rather than operational because an interpreter at the foreign data center utilizes a schema to parse the query and generate the operational APIs. Thereafter, the management tool uses the locally generated APIs to query each instance and collects responsive information on the status and attributes. This information is then used to populate a response that is preferably the format of an XML tree where each leaf node comprises the information of one of the instances. The response is then interpreted at the home data center and parsed to provide the requested information to the source management tool.

The present invention solves the inherent problems of maintaining a plurality of data center environments while enabling the efficient and scaleable mechanism for interrogating a foreign data center to determine the structure of the data center as well as the properties of the target instances even if the foreign data center is subsequently updated. The present invention solves the long felt need to integrate at least two data center environments that each operate under different management software tools.

Although the present invention has been discussed with respect to specific embodiments thereof, these embodiments are merely illustrative, and not restrictive, of the present invention. For example, the methods disclosed herein, such as illustrated in conjunction with FIGS. 3 and 4, can include additional, combined, altered, reordered or fewer method elements without departing from the spirit or the scope of the present invention. In other embodiments, the model based information query of the present invention can be used with a variety of data center management software tools when combined with the interpreter and the appropriate schema. Indeed, embodiments of the present invention are readily adaptable to a variety of such tools and are particularly valuable because there is no need to modify or change the computer code associated with the tool that is used to manage the foreign data center.

Note that any suitable programming language can be used to implement the routines of an embodiment of the present invention including C, C++, C#, Perl, Java, JavaScript, AJAX, assembly language, etc. Different programming techniques can be employed such as procedural or object oriented. The routines can execute on a single processing device or multiple processors. Although certain steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as standalone routines occupying a substantial part, or an in-substantial part of the system processing.

A computer-implemented version of the invention may be embodied using, or residing on, computer-readable medium. A computer-readable medium may include any medium that participates in providing instructions to one or more processors for execution. Such a medium may take many forms including, but not limited to, nonvolatile, volatile, and transmission media. Nonvolatile media includes, for example, magneto-strictive random access memory (MRAM), flash memory or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device. The source code of the software of the present invention may also be stored or reside on mass storage device (e.g., hard disk, magnetic disk, tape, or CD-ROM). As a further example, code of the invention may be transmitted via wires, radio waves, or through a network such as the Internet.

While preferred embodiments are disclosed herein, many variations are possible which remain within the spirit and scope of the invention. Such variations, modifications, alternate constructions, and equivalents will be obvious to those with skill in the art after inspection of the specification, drawings and claims herein. The invention therefore is not to be restricted except by the scope and spirit of the appended claims.

The invention claimed is:

1. In an enterprise data center network system, a component of the system for determining the attribute information and status information of databases in a foreign data center, the component comprising:
   a first network for transmitting data between the enterprise data center and the foreign data center;
   a first module for receiving and interpreting a model based information query, the model based information query comprising a plurality of queries;
   a first schema for interpreting the model based information query;
   a first data center management software tool adapted to receive the interpreted model based information query, to generate at least one application program interface (API) call for a first database and a second database, and to receive at least one response from the at least one API call, wherein the at least one response comprises attribute information and status information of the first database and the second database, wherein the first and second databases are referenced in the model based information query and changes to the first database may be made independently of changes to the second database; and a second module, for transmitting the model based information query to the first module.

2. The component of claim 1 comprising:

a first hardware device, coupled to the foreign data center, wherein the first hardware device comprises the first database; and a second hardware device, coupled to the foreign data center, wherein the second hardware device comprises the second database.

3. The component of claim 1 further comprising a module for generating a response formatted in accordance with the schema and further adapted to format the attribute information and status information of databases in an extensible markup language (XML) tree format.

4. The component of claim 1 wherein the first database comprises at least one entry not found in the second database.

5. The component of claim 1 further comprising a module for generating a response formatted in accordance with the schema whereby the attribute information and status information of databases are returned in an extensible markup language (XML) tree format with a plurality of leaf nodes, where each leaf node corresponds to one of the databases.

6. The component of claim 5 further comprising a data center management software tool associated with the foreign data center that is different from the data center management software tool associated with the home data center.

7. In an enterprise data center network system, computer readable code, stored on computer-readable media of a home data center, for obtaining attribute information and status information of a hardware device in a foreign data center, the computer readable code comprising a code module for generating and sending a model based information query to the foreign data center from the home data center and for interpreting attribute information and status information of targeted hardware device in the foreign data center received from the foreign data center in an extensible markup language (XML) tree format with a plurality of leaf nodes associated with a hardware device of the foreign data center, wherein the model based information query comprises a plurality of queries that are mappable to a plurality of application program interface (API) calls at the foreign data center; and a schema, associated with the module, that provides the rules for preparing the model based information query from the home data center and for interpreting a populated response containing attribute information and status information of targeted hardware devices in the foreign data center.

8. The computer readable code of claim 7 further comprising a data center management software tool adapted to receive the attribute information and status information of targeted hardware devices in the foreign data center and to display the interpreted model based information query.

9. The computer readable code of claim 7 wherein the populated response comprises an extensible markup language (XML) tree format response that is an expanded version of the model based information query populated with attribute information and status information of targeted hardware devices in the foreign data center.

10. The computer readable code of claim 9 wherein the XML tree format comprises a plurality of leaf nodes.

11. A method for determining the attribute information of a plurality of instances in a foreign data center, the method comprising:

at the first foreign data center, receiving a first model based information query comprising a plurality of queries from a home data center;

at the first foreign data center, interpreting, using a schema, the first model based information query to generate a first application program interface (API) call to acquire attribute information for a first software application and a second API call to acquire attribute information for a second software application, the first and second software applications identified in the first model based information query;

from the first foreign data center, returning a first response to the home data center whereby the response comprises attribute information for each software application identified in the first model based information query;

from the first foreign data center, transmitting a second model based information query comprising a plurality of queries to a second foreign data center, different from the first foreign data center and home data center, wherein the second model based information query is different from the first model based information query; and at the first foreign data center, receiving a response from the second foreign data center whereby the response comprises attribute information for each software application identified in the second model based information query.

12. The method of claim 11 wherein the first software application comprises a first database, and the second software application comprises a second database.

13. The method of claim 11 wherein the first foreign data center comprises a first hardware device comprising the first software application, and the first foreign data center comprises a second hardware device comprising the second software application.

14. The method of claim 13 wherein the first software application comprises a first database and the second software application comprises a second database.

15. The method of claim 11 wherein the first foreign data center comprises data center management software that differs from the data center management software at the home data center.

16. A method for determining status and attribute information of a plurality of instances in a foreign data center, the method comprising:

generating, in combination with a schema, a model based information query comprising a plurality of queries directed to a plurality of databases;

transmitting the model based information query to at least one foreign data center, wherein the foreign data center comprises at least two of the databases, the foreign data center being arranged to generate at least two API calls to query the at least two databases to obtain the status and attribute information of the databases, wherein a first database of the at least two databases comprises at least one entry not found in a second database of the at least two databases; and interpreting, in combination with the schema, a response from the foreign data center wherein the response comprises the model based information query populated with status and attribute information for each database identified in the model based information query.

17. The method of claim 16 comprising:
a first hardware device, coupled to the foreign data center, wherein the first hardware device comprises the first database; and
a second hardware device, coupled to the foreign data center, wherein the second hardware device comprises the second database.

18. A device for determining the status and attribute information of a plurality of instances in a foreign data center, the device comprising:
one or more processors; and
a memory containing instructions, that when executed cause the one or more processors to perform a sequence of operations comprising:
receiving through a first network a model based information query comprising a plurality of queries from a home data center;
interpreting, using a schema, the model based information query to generate at least one application program interface (API) call for at least a first database and a second database identified in the model based information query;
and returning a response wherein the response comprises attribute information and status information of the first database and the second database, wherein the first and second databases are referenced in the model based information query and changes to the first database may be made independently of changes to the second database.

19. In a data center, a system for determining the attribute information and status information of targeted instances in a foreign data center, the foreign data center having a plurality of instances, the system comprising:
means for composing a model-based query, the model-based query comprising a plurality of queries, wherein at least one of the plurality of queries is associated with targeted instances in the foreign data center;
means for transmitting the model-based query to the foreign data center over a first network through which the data center and foreign data center are connected;
at the foreign data center, means for interpreting the model-based query using a schema:
at the foreign data center, means for generating at least one API call for the targeted instances in response to the model-based query;
means for receiving populated responses from foreign data center; and
means for presenting attribute information for each of the targeted instances received from foreign data center response, wherein a first instance is independent from a second instance.

20. The system of claim 19, wherein the query comprises a query in XML tree format having a plurality of queries directed to more than one instance.

21. The system of claim 19, wherein the responses from foreign data center comprise an XML tree format populated with a plurality of responses from each target instance.

22. In a data center, a system for determining the attribute information and status information of targeted servers in a foreign data center, the foreign data center having a plurality of servers, the system comprising:
means for receiving a model-based information query, the model-based information query comprising a plurality of queries that reference the targeted servers in the foreign data center;
means for interpreting the model based information query using a schema;
means for generating responsive API calls for the targeted servers;
means for issuing at least one API call to each of the targeted servers, wherein each targeted server is within the foreign data center, a first targeted server is responsive to a first API call, a second targeted server is responsive to a second API call, the first targeted server is not responsive to the second API call, the second targeted server is not responsive to the first API call, and the targeted servers are arranged to be queried for attribute information and status information;
means for receiving response from targeted servers; and
means for populating model based information query with responses.

23. A system for determining the attribute information of a plurality of instances in a first foreign data center, the system comprising an interpreter module for receiving a first model based information query over a network comprising a plurality of queries from a home data center; the interpreter module adapted to interpret, using a schema, the first model based information query to generate a first application program interface (API) call for a first instance to acquire attribute information of the first instance and a second API call for a second instance to acquire attribute information of the second instance, the first and second instances identified in the first model based information query and return a response to the home data center whereby the response comprises attribute information for the first and second instance identified in the first model based information query, wherein the first API call is specific to the first instance and the first instance is not responsive to the second API call, and the second API call is specific to the second instance and the second instance is not responsive to the first API call.

24. The system of claim 23 further comprising schema for use by the interpreter to interpret the first model based information query.

25. The system of claim 23 wherein the first model based information query comprises a query in extensible markup language (XML) tree format having a plurality of queries directed to more than one instance.

26. The system of claim 23 further comprising populating the first model based information query with attribute information.

27. The system of claim 1 wherein the first module parses the model based information query into a plurality of individual information queries and queues the plurality of queries for handling by the first data center management software tool.

* * * * *